FIG. 1

| SYSTEMS WITH 2 VARIABLE INPUTS | | | |
|---|---|---|---|
| | NUMBER OF POSITIVE INPUTS | | LOGICAL OPERATION PERFORMED |
| | 0 | 1 | 2 | |
| PHASE OF OUTPUT | − | + | + | OR |
| | − | − | + | AND |
| | − | + | − | EXCLUSIVE OR |

FIG. 2

| SYSTEMS WITH 3 VARIABLE INPUTS | | | | | |
|---|---|---|---|---|---|
| | NUMBER OF POSITIVE INPUTS | | | | LOGICAL OPERATION PERFORMED | LINE |
| | 0 | 1 | 2 | 3 | | |
| PHASE OF OUTPUT | − | + | + | + | OR (1, 2, OR ALL 3) | 1 |
| | − | − | + | + | MAJORITY (2 OR 3 OUT OF 3) | 2 |
| | − | + | − | + | BINARY SUM (1 ONLY OR ALL 3) | 3 |
| | − | + | + | − | 1 OR 2 ONLY, OUT OF 3 | 4 |
| | − | − | − | + | AND (ALL 3) | 5 |
| | − | − | + | − | 2 ONLY, OUT OF 3 | 6 |
| | − | + | − | − | EXCLUSIVE OR (1 ONLY, OUT OF 3) | 7 |

June 6, 1961 K. E. SCHREINER 2,987,630
INFORMATION-HANDLING APPARATUS
Filed June 18, 1958 3 Sheets-Sheet 3
FIG.6
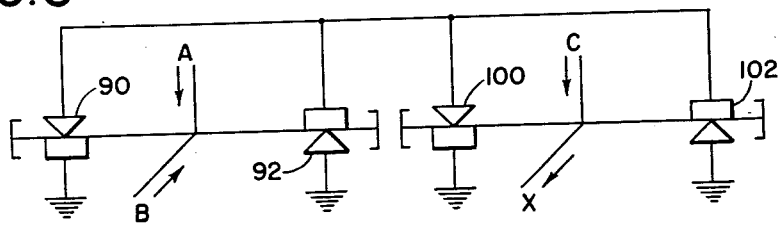
FIG.7
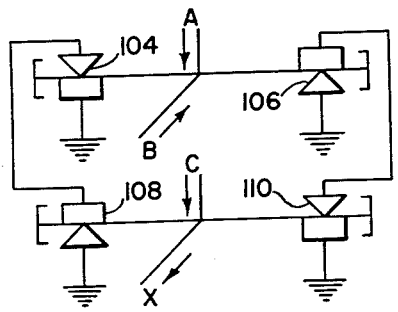
FIG.8
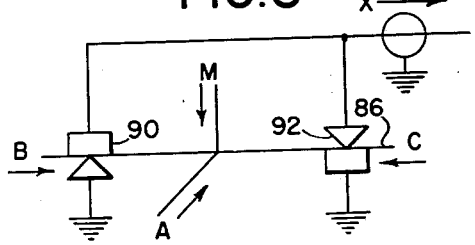
FIG.9
| A | + | + | − | − |
|---|---|---|---|---|
| B | + | − | + | + |
| C | + | + | + | − |
| X | + | − | + | − |
FIG.10
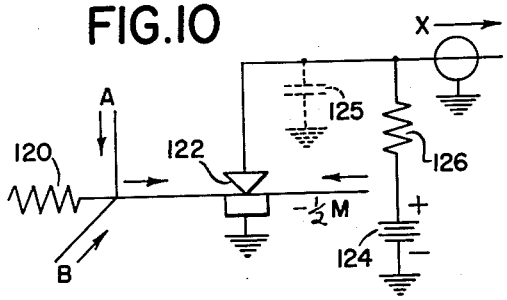
FIG.11
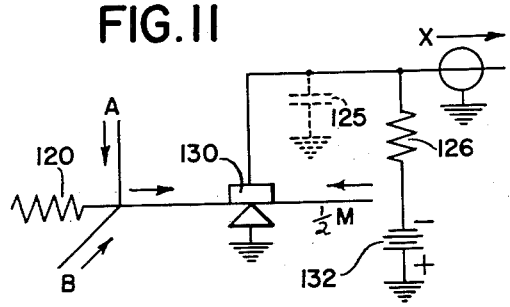
FIG.12
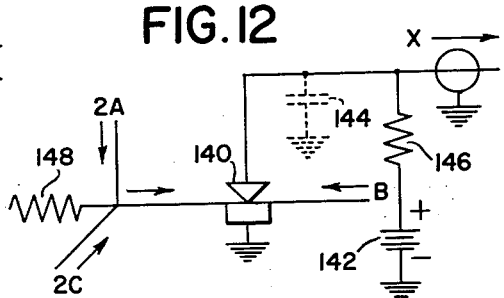

United States Patent Office 2,987,630
Patented June 6, 1961

2,987,630
INFORMATION-HANDLING APPARATUS
Kenneth E. Schreiner, Harrington Park, N.J., assignor to International Business Machines Corporation, New York, N.Y., a corporation of New York
Filed June 18, 1958, Ser. No. 742,803
16 Claims. (Cl. 307—88.5)

This invention relates to information handling, and more particularly to apparatus and methods for performing logical operations.

The present application is a continuation-in-part of the joint application of this applicant and B. L. Havens, Serial No. 715,353, filed February 14, 1958. The present application discloses and claims certain subject matter disclosed but not specifically claimed in said joint application.

The invention is particularly adapted for performing logical operations in a system in which certain information is represented by a first phase characterized wave of one phase with reference to a fixed phase standard and certain other information is represented by a second phase characterized wave, the phase of the second wave differing materially from that of the first, preferably differing by substantially 180 degrees. For example, in a binary digital computing system, the digit "one" may be represented by a wave of one phase, and the digit "zero" may be represented by a wave 180 degrees out of phase with the first wave. In such systems, the present invention may be used to mechanize various logical operations, for example, "OR," "AND," "EXCLUSIVE OR," "BINARY ADDITION," etc.

The term "phase characterized wave" as used herein is to be understood to include unidirectional pulses as well as alternating waves. For example, a unidirectional pulse is phase characterized in that it has a polarity that is either the same as or opposite from the polarity of a pulse of reference polarity. In other words, a pulse may be either positive or negative. An alternating wave is phase characterized by having a particular phase with reference to a wave of reference phase. In a binary system, a phase-characterized wave may be of positive phase or negative phase with respect to the wave of reference phase. Thus a wave may be controlled, that is, modulated, so as to have, at any given moment, a characteristic phase which represents certain information carried by the wave.

A feature of the invention is the adaptability of the system to the use of electromagnetic waves of very high, or ultra-high frequencies, commonly called microwaves, of, for example, ten kilomegacycles per second or more, although the invention may also be used at other frequencies.

An object of the invention is to increase the speed at which logical operations may be performed.

In accordance with this object, the invention is adaptable to the use of microwave elements such as T wave guide junctions, diode rectifiers and modulators, etc., which can be used for very high speed transmission of signals. For example, if ten cycles of an alternating wave are required to transmit one binary digit, or bit, the bit interval required to transmit intelligence by means of a ten kilomegacycle wave is only one millimicrosecond.

Another object of the invention is to improve the accuracy and reliability of a system for performing logical operations. This object is particularly promoted by the use of phase characterized waves of the type aforementioned, since different information may be represented by different waves of substantial and closely equal amplitude, thereby reducing the effects of noise and other interfering waves.

A further object of the invention is to simplify the circuitry of a system for performing logical operations.

In an illustrative system in accordance with the invention there is provided a wave guide structure including a phase-determinative junction or meeting of a plurality of wave guide arms together with one or more variable-impedance elements. Among examples of such variable impedance elements are semi-conductor diodes, or other rectifiers, which have variable resistance properties.

In the operation of the invention, phase characterized waves representing different items of information are impressed upon the system at various points and a phase characterized wave is derived which represents by means of its phase characterization an item of information which is the result of combining the first-mentioned items of information according to a given rule of combination or logical operation.

The phase-determinative junction functions with respect to a phase characterized wave of the alternating type, while the variable-impedance rectifier may react with either an alternating wave or with a pulse.

At a phase-determinative junction, an alternating wave may give rise to two alternating waves and these may be either of like phase or of unlike phase as determined by the nature of the junction. Or, when two alternating waves are combined at a phase-determinative junction a resultant wave may be of positive phase or negative phase depending upon the phases of the waves that are combined and also upon the nature of the junction.

A variable-impedance element such as a rectifier located in an arm of the wave guide structure may be acted upon by an impressed alternating wave, in which case a unidirectional pulse is derived, the phase characterization, that is, the polarity, of which depends upon the direction of best conductivity in the rectifier. In other words, the polarity of the derived pulse depends upon, and is the same as, the polarity of the rectifier. This polarity is independent of the phase of the impressed wave.

The variable-impedance element may in another case be acted upon by an impressed pulse. Then a wave-reflective property of the element is altered due to the variable impedance property, so that the resultant phase of alternating waves in various portions of the wave guide system is changed.

Other features, objects and advantages will appear from the following more detailed description of an illustrative embodiment of the invention, which will now be given in conjunction with the accompaning drawings.

In the drawings,

FIG. 1 is a tabular representation of some possible logical operations that may be performed in a system with two variable inputs, using the principles of the invention;

FIG. 2 is a tabular representation of some possible logical operations that may be performed in accordance with the invention in a system with three variable inputs;

FIG. 6 is a schematic diagram showing how the systems of FIGS. 4 and 5 may be combined to form a three-input logical system for computing a binary sum of three digits;

FIG. 7 shows a variation of the system of FIG. 6 which corresponds to the BINARY SUM system which appears in greater detail in FIG. 3;

FIG. 8 shows an elaboration of the system of FIG. 4 for use in performing a different operation from that described in connection with the system of FIG. 4;

FIG. 9 is an operational table for the system shown in FIG. 8; and

FIGS. 10, 11 and 12 show modifications of the system of FIG. 4 for performing still other operations.

Figure 3:
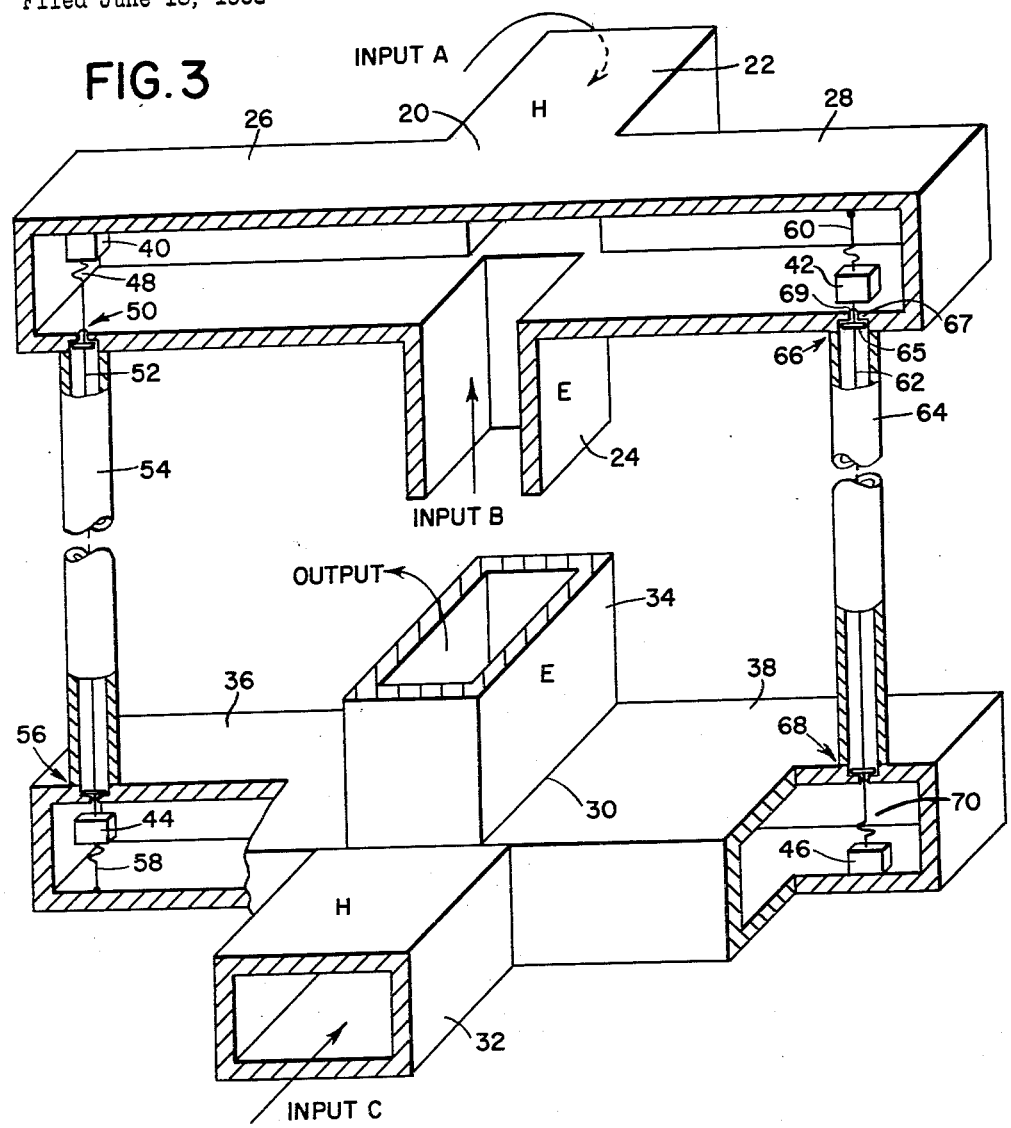
FIG. 3 is a perspective view, partly cut away, of an illustrative embodiment of the invention as applied to a binary adder.

Wherever herein the phase of an alternating wave is described or specified, it is to be understood that the phase depends upon the point in the system at which the phase is observed, and at a given point in the system the phase of the alternating wave is relative to the phases of other alternating waves at the same point. Furthermore, it will be noted that inversion of phase of an alternating wave occurs at points electrically separated from a given point by one-half wavelength, so that a length of wave guide or of coaxial cable having an electrical length of an odd number of half wavelengths serves as an inverter, for use wherever the logical operation of inversion is required.

Various arrangements of microwave circuit components may be used to mechanize logical operations such as "OR," "AND," "MAJORITY," "BINARY ADDITION," etc. In systems having two input waves either of which may be a phase characterized wave representing a binary one or a binary zero and which may have a relative amplitude of $+E$ or $-E$, the logical operations OR, AND, and EXCLUSIVE OR may be performed as indicated in tabular form in FIG. 1. For performing the OR operation, the system is so designed that if either one or both of the input voltages A and B respectively are $+E$ thus representing a binary one, the phase characterization, or briefly the "phase" of the output wave from the device is positive, and if neither is $+E$, the phase of the output wave is negative. A system of this sort is indicated in the first line of plus and minus signs in FIG. 1. A positive output is thus obtained whenever either A OR B, or both, are positive. In other words, if either A or B represents a binary digit one, the output is a digit one.

For performing the AND operation, the system is designed as indicated in the second line of plus and minus signs in FIG. 1. That is, if both input voltages A AND B are $+E$, then the phase of the output wave is positive, otherwise the phase of the output wave is negative.

For performing the EXCLUSIVE OR operation, the system is designed as indicated in the third line of plus and minus signs in FIG. 1. That is, if one and only one of the input voltages A and B is equal to $+E$, then the phase of the output wave is positive, otherwise the phase of the output wave is negative.

Each operation has an inverse which is obtained by reversing all the output phases.

It will be noted that in the process of binary addition of two digits as shown by Table 1, the sum may be determined by performing the two-input EXCLUSIVE OR operation upon input waves representing the two digits to be added, and that the resultant carry may be determined by performing the AND operation. If a digit 1 is represented Table 1

| A | B | Sum | Carry |
|---|---|---|---|
| 0 | 0 | 0 | 0 |
| 0 | 1 | 1 | 0 |
| 1 | 0 | 1 | 0 |
| 1 | 1 | 0 | 1 | by a wave of positive phase or briefly by a positive wave and a digit 0 by a negative wave, the table shows that the system for indicating the sum should respond with a positive output wave if and only if just one input wave is positive. That is, the logical operation required to obtain the sum is the EXCLUSIVE OR. The system for obtaining the carry digit should respond with a positive output wave if and only if both inputs are positive. That is, the carry determination requires the AND operation.

FIG. 2 shows some logical operations that may be performed in a system with three input waves in a manner generally similar to the operation of the systems with two input waves given in FIG. 1. Systems using four or more input waves may also be devised.

In FIG. 2, line 1 describes a system for performing the logical OR operation for three inputs, that is, the system is designed to give an output of positive phase characterization if and only if one, two or all three of the inputs are of positive phase characterization. Line 2 describes a MAJORITY system, that is, one which responds with a positive output if and only if two or three of the inputs are positive. Line 3 describes a system for obtaining the binary sum of three digits. The system gives a positive output if and only if just one or else all three of the inputs are positive. It will be noted that in the process of binary addition involving three digits to be added the MAJORITY operation determines the carry digit resulting from the addition and the BINARY SUM operation determines the resultant sum digit. This follows from the table of binary addition as shown in Table 2 for three digits, A, B, C, provided that a digit 1 is represented by Table 2

| A | B | C | Sum | Carry |
|---|---|---|---|---|
| 1 | 1 | 1 | 1 | 1 |
| 1 | 1 | 0 | 0 | 1 |
| 1 | 0 | 1 | 0 | 1 |
| 0 | 1 | 1 | 0 | 1 |
| 1 | 0 | 0 | 1 | 0 |
| 0 | 1 | 0 | 1 | 0 |
| 0 | 0 | 1 | 1 | 0 |
| 0 | 0 | 0 | 0 | 0 | a wave of positive phase and a digit 0 is represented by a wave of negative phase. Then a system that is to produce an output wave indicative of the sum should respond with an output wave of positive phase when any one or all three of the input waves are of positive phase and should respond with a wave of negative phase when any two or else none of the input waves are of positive phase. Thus the logical operation required to be performed by the system to obtain the sum is that labeled "BINARY SUM" in FIG. 2 and indicated by line 3 of the figure. It will also be seen that a system that is to determine the carry digit resulting from the addition of three binary digits should respond with a positive output wave when any two or all three of the input waves are positive and should respond with a negative output wave when only one or none of the input waves are positive. Thus the logical operation required is that labeled MAJORITY and shown in line 2 of FIG. 2.

Lines 4 through 7 of FIG. 2 indicate other logical systems, of which the system of line 4 responds with a positive output wave if and only if one or two only of the input waves are positive. The system of line 5 performs the logical AND operation for three quantities, that is, it responds with a positive output wave if and only if all three inputs are positive. The system of line 6 responds with a positive output if and only if exactly two of the three inputs are positive. The system of line 7 performs the logical EXCLUSIVE OR operation, that is, it responds with a positive output if and only if exactly one of the inputs is positive.

Table 3 shows that the logical operation of computing the binary sum of three digits may be accomplished in two steps, each of which steps is equivalent to the operation of "EXCLUSIVE OR" listed in the tabulation of FIG. 1.

Table 3

| A | B | Exclusive Or of A and B, designated D | C | Exclusive Or of C and D | Sum of A, B and C |
|---|---|---|---|---|---|
| 1 | 1 | 0 | 1 | 1 | 1 |
| 1 | 1 | 0 | 0 | 0 | 0 |
| 1 | 0 | 1 | 1 | 0 | 0 |
| 0 | 1 | 1 | 1 | 0 | 0 |
| 1 | 0 | 1 | 0 | 1 | 1 |
| 0 | 1 | 1 | 0 | 1 | 1 |
| 0 | 0 | 0 | 1 | 1 | 1 |
| 0 | 0 | 0 | 0 | 0 | 0 |

The result shown by means of Table 3 also follows directly from the rule that the sum of two binary digits may be obtained by performing the two-input EXCLUSIVE OR operation inasmuch as the sum of two digits may then be added to a third digit by a second performance of the two-input EXCLUSIVE OR operation.

FIG. 3 shows an illustrative embodiment for computing the sum of three given binary digits, one of which may be a carry digit from a previous addition. The new carry resulting from adding the said three digits is not computed by the system of FIG. 3, but may be found by means of a MAJORITY circuit. While in effect the system of FIG. 3 performs according to line 3 of FIG. 2 it actually comprises two EXCLUSIVE OR systems each of the type designed for two inputs which has been shown above to be an equivalent system. In the first EXCLUSIVE OR system any two of the three given binary digits may be combined and in the second system the digit resulting from the first combination may be combined with the third given digit to obtain the binary sum of the given three digits.

In FIG. 3, a wave guide hybrid junction or T junction, commonly called a "magic-T" is shown at 20 and has an H-arm 22, an E-arm 24 and side arms 26, 28. For clarity, the arms 22, 24 are labeled "H" and "E," respectively. A second, similar magic-T 30 is shown with H-arm 32, E-arm 34 and side arms 36, 38. Within the side arms 26, 28, 36, 38 respectively are suitably mounted and connected semiconductor diodes 40, 42, 44, 46. These semiconductor diodes may be regarded as variable resistance elements, in that their effective resistance varies with the voltage applied thereto or the current passing through them. The base of diode 40 is conductively connected to the conductive top plate of side arm 26. The connecting whisker 48 of the diode 40 is led through a low pass filter structure 50 and connected to the inner conductor 52 of a coaxial cable 54 which connects the side arm 26 with the side arm 36 of magic-T 30. The base of the diode 44 is connected to the conductor 52 through a low pass filter structure 56, and the whisker 58 of the diode 44 is conductively connected to the conductive bottom plate of the side arm 36. The diode 44 is preferably mounted near the top plate of the side arm 36. The whisker 60 of the diode 42 is conductively connected to the top plate of side arm 28, while the base of diode 42 is connected to the inner conductor 62 of a coaxial cable 64 through a low pass filter structure 66 associated with the bottom plate of side arm 28. The conductor 62 at its lower end connects through a low pass filter structure 68 associated with the upper plate of side arm 38 to the whisker 70 of diode 46. The base of diode 46 is connected to the bottom plate of side arm 38. The cable 64 connects side arms 28 and 38 as shown.

The low pass filter structure 66 is typical of the four filter structures shown and comprises a conductive plate or disk 65 attached to or integral with the conductor 62. The element 65 is positioned within the coaxial cable 64 and close to and parallel with a portion 67 of the wall of the bottom plate of the side arm 28 to provide a definite amount of capacitance between the opposed surfaces.

The conductor 62 is extended through a hole 69 in the bottom plate of the side arm and is connected to the underside of the diode 42.

The side arms 26, 28 are preferably of equivalent electrical length and the diodes 40, 42 at electrically equivalent distances from the center of magic-T 20. Likewise, the side arms 36, 38 are preferably of equivalent electrical length and the diodes 44, 46 at electrically equivalent distances from the center of magic-T 30. Also the cables 54, 64 are preferably of equivalent electrical length to each other. Furthermore, the coaxial cables 54 and 64 should be short enough so that the time required for a pulse to travel from one end of the cable to the other is small compared to the pulse interval, in order that concurrent input waves A, B and C may interact substantially simultaneously in magic-T 30.

In the operation of the system of FIG. 3, an input wave A is impressed upon one of the arms 22, 24 of magic-T 20, for example, upon the H-arm 22 as shown. An input wave B is impressed upon the arm 24. A third input wave C may be impressed preferably upon the H-arm 32, of the magic-T 30. An output wave is developed in the E-arm 34. The input waves A and B are preferably adjusted to have substantially equal amplitudes. Side arms 26 and 28 contain respectively the semiconductor diodes 40 and 42. The diodes, located preferably at equivalent electrical distances from the center of junction 20, are preferably matched to each other and they are connected in opposite polarities as shown. Each diode in the presence of an alternating electromagnetic wave of whatever phase produces a current in the direction of best conductivity of the diode. Stated differently, each of these diodes, having a variable resistance property and thus a non-linear voltage-current characteristic, serves as a detector. The diode currents are carried as by coaxial cables 54 and 64 respectively to the other diodes 44, 46 located respectively in side arms 36 and 38 of junction 30. Diode current from diode 40 flowing through diode 44 will modify the wave reflective properties of the side arm 36 and diode current from diode 42 flowing through diode 46 will modify the wave reflective properties of side arm 38, so that reflected waves from one or the other of arms 36 and 38 will predominate in the combination of reflected waves that reach the center of the junction 30.

It will thus be understood that the voltages applied through the coaxial cables 54 and 64 to the elements 44 and 46 serve to vary their effective resistances and reactances and hence their impedances, and thereby to vary their wave reflecting properties.

Among examples of semiconductor diodes which may be used as the variable impedance elements 40, 42, 44 and 46 are those of the silicon or germanium types suitable for use in microwave circuits.

The low pass filter structures 50, 56, 66, 68 serve to prevent any material amount of transmission of waves from inputs A and B into coaxial cables 54, 64 and thence into magic-T 30, or from input C into the coaxial cables and thence into magic-T 20. The filter structures may be proportioned by known design procedures so that they will pass the diode currents, which latter have pulse rates which are relatively low compared to the frequency of waves from inputs A, B and C.

Figure 4:
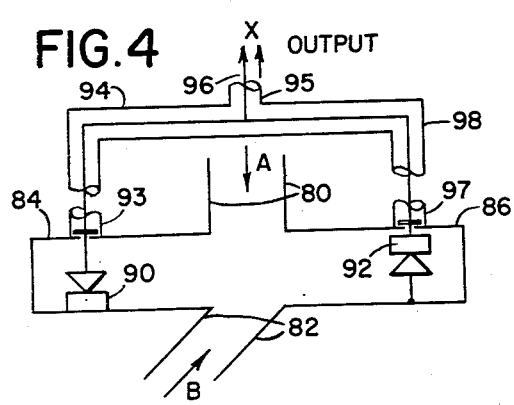
FIGS. 4 and 5 are schematic diagrams of different types of systems for performing the logical operation "EXCLUSIVE OR" in the case of two input quantities.
Figure 5:
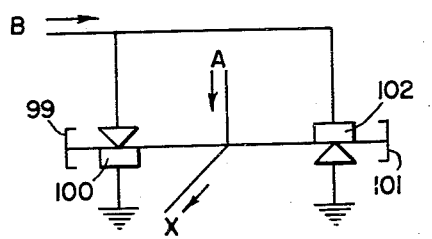

A better understanding of the operation of the system of FIG. 3 may be obtained at this point by consideration of the systems shown diagrammatically in FIGS. 4, 5, 6 and 7. FIG. 4 shows a two-input EXCLUSIVE OR system in which the phase characterized input waves are phase-modulated alternating waves and the output wave is a polarized pulse. FIG. 5 shows another two-input EXCLUSIVE OR system in which one input wave may be a polarized pulse from the output of the system of FIG. 4 while the other input wave and the output wave are phase-modulated alternating waves. FIG. 6 shows one way in which the output of the system of FIG. 4 may be connected to one of the inputs of the system of FIG. 5 to form a system for performing the two-input EXCLUSIVE OR operation successively to compute the binary sum of these digits. FIG. 7 shows how the system of FIG. 6 may be altered to form a BINARY SUM system which is of the kind shown in more detail in FIG. 3. Therefore, the systems of FIGS. 4, 5, 6 and 7 will now be described in order to complete the description of the operation of the system of FIG. 3.

FIGS. 4, 5, 6 and 7 each show in diagrammatic representation a wave guide junction like the junctions 20 and 30 that are shown in perspective and partly broken away in FIG. 3, together with diagrammatic representations of diodes and coaxial lines or other connectors present in FIG. 3.

In FIG. 4, the walls of the E-arm of a wave guide junction are shown somewhat diagrammatically by vertical lines at 80, the H-arm by diagonal lines at 82, and the side arms at 84, 86. Diodes 90 and 92 are shown connected to the side arms 84 and 86 respectively in the manner of the system of FIG. 3, it being understood that the diodes are located inside the respective side arms and are oppositely connected to the wave guide walls as in FIG. 3. One terminal of each diode is conductively connected to the wave guide structure as indicated. The remaining terminal of diode 90 is connected through a low pass filter structure 93 and a coaxial cable 94 to a T-junction 95 and an output coaxial cable 96. The remaining terminal of diode 92 is similarly connected through a filter 97 and a coaxial cable 98 to the T-junction 95 and output cable 96 in opposite polarity with respect to diode 90. The diodes 90 and 92 may be regarded as acting as sources of electromotive force with internal resistance so that there is no tendency of one diode to short circuit the other diode with respect to the output cable.

FIG. 5 and later in schematic figures including a wave guide junction the E-arm is shown simply by a vertical line, the H-arm by a diagonal line and the side arms by horizontal lines, the lines meeting at the junction point. Where a diode is shown, the line representing an arm of a wave guide junction is drawn through the center of the symbol for the diode, to indicate that the electromotive force of the diode is developed within the wave guide. Short circuited ends of wave guide junction arms are represented by bracket-like symbols as at 99 and 101 in FIG. 5.

In the operation of the system of FIG. 4 as a two-input EXCLUSIVE OR circuit a pulse of rectified voltage of one polarity is obtained at load 98 constituting an output wave at X when one of the diodes is subjected to alternating waves of either phase and a pulse of the reverse polarity is obtained at X when the other diode is subjected to alternating waves of either phase. The A and B inputs are impressed upon arms 80 and 82 respectively and should be so phased that, for example, they add in the left-hand arm of the magic-T and subtract in the right-hand arm when both A and B are positive and when both A and B are negative. In this case, as shown in the drawing, the voltage developed at rectifier 90 is so poled as to tend to draw current out of the output through inner conductor of cable 96, thus giving a negative response at X. If, on the other hand, A and B are of opposite phases to each other, they subtract in the left-hand arm and add in the right-hand arm. In this case, the rectified voltage tends to send current into the output, giving a positive indication at X. Therefore, the response of the system is positive if one and only one of the input waves A and B is positive, as required of a logical EXCLUSIVE OR circuit by the table in FIG. 1.

The system of FIG. 5 is another two-input EXCLUSIVE OR circuit, differing from the system of FIG. 4 in the respect that whereas in FIG. 4 the input waves A and B are phase-modulated alternating current waves and the output X is a unidirectional voltage or current, in FIG. 5 one input B is a unidirectional voltage or current pulse impressed upon oppositely poled diodes 100 and 102 and the input A and the output X are phase-modulated alternating current waves. Here, the reflection characteristics of the diodes 100 and 102 are used. As the current through a diode exposed to incident alternating waves increases, the percentage of incident power which is reflected increases assuming an initial impedance match between the diode and the wave guide. The input A is impressed upon the E-arm of the wave guide junction so that as viewed at the output X, one diode reflects waves of positive phase and the other diode reflects waves of negative phase due to the nature of the magic-T type of junction. The phases of A and B are to be adjusted initially so that when A and B are both positive, the output wave at X is negative. Then, when A and B are both negative, the output wave will again be negative, for the reflection characteristics of the diodes have been reversed at the same time that the phase of A has been reversed, with no resultant change in the final result. If, however, either A or B alone is changed in polarity, so that one is positive and one negative, the output wave becomes positive. It will be readily seen therefore that the system performs as an EXCLUSIVE OR circuit.

FIGS. 6 and 7 show systems for performing the binary addition of two binary digits, taking account of carry from a preceding operation of addition.

The system of FIG. 6 is a combination of the two-input EXCLUSIVE OR circuits of FIG. 4 and FIG. 5 respectively. The left-hand portion of the system of FIG. 6 passes a positive unidirectional output to the right-hand portion whenever one and only one of the inputs A and B is positive. The right-hand portion of the system develops an output wave of positive phase whenever either a positive input is received from the left-hand portion or C is positive, but not both, as required to give the correct binary sum. The diodes are numbered as in FIGS. 4 and 5.

FIG. 7 is a variant of the system of FIG. 6 and is in fact the system used in the circuit of FIG. 3, the upper and lower magic-T's of FIG. 7 corresponding to the magic-T's 20 and 30 respectively, with associated diodes as shown. Diodes 104 and 106 in the upper wave guide junction in FIG. 7 are coupled respectively to diodes 108 and 110 in the lower wave guide junction. In the operation of the system of FIG. 7, when diode 104 is energized it sends a current through diode 108 causing waves from branch C to be reflected predominantly in one particular phase similarly to the case in the operation of the system of FIG. 6. Similarly, when diode 106 is energized, it sends a current through diode 110 causing waves from branch C to be reflected predominantly in the opposite phase compared to the waves in the case when diode 108 is predominant.

It will be noted that if the polarity of both diodes 106 and 110 is reversed no change in operation of the system results. Likewise, if the polarity of both diodes 104 and 108 is reversed no change in operation results.

From the foregoing description of the operation of the system of FIG. 7 the operation of the similar system shown in more detail in FIG. 3 will now be evident. It will be noted that the upper junction in FIG. 7 corresponds to the junction 20 in FIG. 3, the lower junction in FIG. 7 to the junction 30, and that the diodes 104, 106, 108 and 110 in FIG. 7 correspond respectively to the diodes 40, 42, 44 and 46 in FIG. 3.

In similar manner, systems may be devised to perform other logical operations.

An important form of logical operation and one which is not listed in FIGS. 1 and 2 is that performed by a two-position switch. Its characteristic pattern of operation is given in tabular form in FIG. 9 and a circuit for performing the operation is shown in FIG. 8.

The table of FIG. 9 shows that the branch A of the system of FIG. 8 functions to select between branches B and C to throw the control of the output polarity at X exclusively to branch B or exclusively to branch C. That is, a wave of positive phase applied at A puts the output at X under the control of the phase at B while rendering the input phase at C of no effect whatever upon the output polarity at X. On the other hand, a wave of negative phase applied at A puts the output at X under the control of the phase at C while rendering the input phase at B of no effect whatever upon the output polarity at X.

The system of FIG. 8 is basically the same as the system of FIG. 4 with additional input waves impressed upon the side arms 84 and 86. The additional input waves come in from the portions of the side arms remote from the center of the junction, as shown.

The mode of operation of the system of FIG. 8 may be understood by considering the effect of an input wave of amplitude +2E at M in the E-arm of the magic-T together with input waves of amplitude +2E or −2E in various combinations at A, B and C respectively. The wave at A is applied to the H-arm of the magic-T. The wave at B is applied to the diode 90 in the left-hand side arm 84 and the wave at C is applied to the diode 92 in the right-hand side arm 86. The diodes are connected in parallel relation to the output branch X. Each diode when excited by an alternating wave delivers unidirectional current or potential to the X branch in the polarity determined by the more conductive direction of the respective diode. A preponderance of one polarity over the other determines the resultant polarity of the response in the branch X, as in the system of FIG. 4.

For example, a wave of voltage +2E at A delivers +E to the left-hand diode and +E to the right-hand diode; a wave of voltage +2E at B delivers +2E to the left-hand diode; and a wave of voltage +2E at C delivers +2E to the right-hand diode. A wave of fixed phase represented by +2E at M delivers +E to the left-hand diode and −E to the right-hand diode. Because of the known properties of the magic-T, substantially no energy from B reaches the right-hand diode 92. Similarly, substantially no energy from C reaches the left-hand diode. Accordingly, the total voltage at the left-hand diode is +4E and at the right-hand diode the total voltage is +2E. The net voltage available at X is therefore of the polarity determined by the left-hand diode, which polarity is designated as positive in the table of FIG. 9. If now there is substituted at C a wave of voltage −2E for the wave of voltage +2E originally assumed, the wave at C delivers −2E to the right-hand diode, making the total voltage at the right-hand diode −2E instead of +2E. But voltages of −2E and +2E impressed upon a diode give the same polarity of response at X. Hence, the final result at X has not been changed at all by the reversal of phase at C. That is, the output is not affected by the wave at C. Reversal of phase of the wave at B, on the other hand, delivers −2E to the left-hand diode, making the total voltage at the left-hand diode 0 where it was +4E before. The total voltage at the right-hand diode, however, is +2E as before. Thus the output is of the negative polarity. So, control of the output phase lies with input wave B to the exclusion of control by input wave C. Similarly, it may be shown that when input wave A is of negative phase the control of the output wave lies with input wave C to the exclusion of input wave B.

In the system of Fig. 10, the output from the magic-T is connected to a biased diode 122 together with a fixed phase input wave from the far end of the same side arm of the magic-T. The remaining side arm is non-reflectively terminated as shown diagrammatically at 120. The diode is biased in the conductive direction as by a battery 124. The stray capacitance to ground of the diode is represented at 125. A dropping resistor 126 is provided for diode 122 in order that a voltage drop due to current developed by the diode may be opposed to the voltage of the battery 124 and the algebraic sum of the voltages may be sensed in an output circuit X.

In the operation of the system of FIG. 10, an input voltage of +2E applied at A give −E in the matched termination 120 and +E at the diode and a voltage of −2E applied at A gives +E in the matched termination and −E at the diode. An input voltage of +2E applied at B gives +E in the matched termination and +E at the diode and a voltage of −2E applied at B gives −E in the matched termination and −E at the diode.

To make the system of FIG. 10 operate as an OR circuit, the value of M is required to be +2E. Thus, −½M applied to the system as shown gives −E at the diode. For OR operation, the diode is required to be biased so that it is initially conductive.

When A and B are both positive, the voltage at the diode is +E from A, +E from B, together with −E from −½M, giving a resultant voltage of +E at the diode. The amount of bias applied to the diode and the resistance value of resistor 126 should be adjusted so that the rectified voltage delivered to the output circuit X by the alternating wave of voltage E will be positive. The stray capacitance 125 acts to smooth out the ripples in the rectified current.

When A and B are opposite in phase, the voltage contribution at the diode from the combination of A and B is zero, leaving only −E from ½M effective at the diode. The rectified voltage set up across the diode by the alternating wave of voltage −E is the same as for an alternating wave of voltage +E since these two alternating waves differ from each other in phase only, which difference is not distinguishable to the diode. The over-all effect is the same as in the previous case, that is, the voltage at X is positive.

When A and B are both negative, the voltage at the diode is −E from A, −E from B, and −E from ½M, giving a resultant voltage of −3E at the diode. The bias voltage and loading resistance are preferably adjusted so that the rectified voltage in the output circuit that results from an alternating input of 3E is negative. In fact, the bias can be adjusted at such a point with respect to the two values of rectified voltage, that an advantageous result is obtained, namely that the output voltage is of substantially the same absolute value in response to any combination of phases in A and B. At the same time, the response of the system is positive if either A or B, or both, are positive, and negative if neither A nor B is positive, as required for the logical OR operation.

The system of FIG. 10, if it is to be used as an AND circuit requires modification as shown in FIG. 11, that is, +M is to be substituted for −M, and both the diode, now designated 130, and the biasing means, now designated 132, are to be of reversed polarity compared to the polarities in FIG. 10.

In the operation of the system of FIG. 11, when A and B are both positive, the voltage contributions at the diode 130 are +E from A, +E from B, and +E from the fixed phase input, giving a resultant voltage of +3E at the diode. The circuit may readily be adjusted so that the resultant rectified voltage in the diode now results in a positive output voltage at X.

When A and B are opposite in phase to each other, the voltage contribution at the diode of the combination of A and B is zero, leaving +E effective at the diode. By proper circuit adjustment this results in a negative output voltage at X, similarly as in the case of FIG. 10.

When A and B are both negative, the voltage contributions at the diode are −E from A, −E from B, and +E from the fixed phase input, giving a resultant voltage at the diode of −E, which again results in a negative output voltage at X.

Thus, the system of FIG. 11 gives a positive response only when A and B are both positive, as is required of an AND circuit. Again, as in the case of FIG. 10, the output voltage can be made of substantially unchanging absolute value under every combination of phases of A and B.

FIG. 12 shows an arrangement of a magic-T, a diode 140, biasing means 142, stray capacitance 144 and voltage dropping resistor 146, for producing a positive output wave when only one or two out of three input waves are positive as called for in line 4 of FIG. 2. This system may be adjusted so that waves of voltages 2A, B, and 2C when acting alone each contribute a voltage E at the diode. The side arm remote from diode 140 is non-reflectively terminated at 148. The resultant voltage wave at the diode depends upon how many of the input waves are positive. If there are only one or two positive inputs, the voltage at the diode is +E or —E, leaving a positive response at X. If none or all of the input phases are positive, the voltage at the diode is +3E or —3E, giving a negative response at X. The principle of operation is essentially similar to that of the system of FIG. 10.

It may be noted that ordinary T-junctions may be used instead of magic-T's in the systems of FIGS. 10, 11 and 12, since in these systems there is no switching of wave output from one arm of the junction to another such as occurs, for example, in the system of FIG. 4.

While the systems illustrated are designed particularly for the microwave frequency region because of the advantage in operating speed obtained in that region as compared to lower frequencies, no restriction to any particular frequency region is to be implied. In other frequency regions, various means are available for combining phase-modulated waves in a manner analogous to the operation of the wave guide junctions, etc., commonly employed in the microwave frequency region. For example, at lower frequencies hybrid coils, balanced modulators employing transistors, vacuum tubes, diodes, etc., may be used.

While an illustrative form of apparatus and a method in accordance with the invention have been described and shown herein, it will be understood that numerous changes may be made without departing from the general principles and scope of the invention.

What is claimed is:

1. In an information handling system, in combination, a wave supporting structure including a phase-determinative junction and a plurality of arms, together with variable-impedance means in at least one of said arms, means for applying to one of said arms a wave A and to another of said arms a wave B, each of said waves being phase-modulated in one or the other of two substantially opposite phases, and representing, by its phase, an item of information, output means connected to said variable impedance means, said structure being adapted to combine said waves A and B, and said variable impedance means being positioned and adapted to sense the result of the combining of said waves, said result depending upon whether they are of like phase or of opposite phase, and to produce in said output means a signal having two conditions and representing by its condition the result of combining said items of information represented by said phase-modulated waves.

2. Apparatus according to claim 1 in which said wave supporting structure comprises a T junction for supporting microwaves, and said variable-impedance means comprises a semiconductor device.

3. Apparatus according to claim 1 including a second phase-determinative junction connected to said variable impedance means and controlled thereby.

4. In an information handling system, in combination, a wave supporting structure including a phase-determinative junction and a plurality of arms, together with variable-impedance wave-reflecting means in said structure, means for applying to one of said arms a wave phase-modulated in one or the other of two substantially opposite phases, representing by its phase at a given moment an item of information, means for applying to said wave-reflecting means a control signal having at a given moment a selected one of two conditions, representing by its said condition an item of information, said structure having an output arm and being adapted to produce in said output arm an output wave having the same phase as said input wave or of opposite phase to that of said input wave, depending upon the said selected condition of said signal applied to said wave-reflecting means.

5. Apparatus according to claim 4 in which said wave supporting structure comprises a T junction for supporting microwaves, and said variable-impedance wave reflecting means comprises a semiconductor device.

6. In an information handling system, in combination, a wave guide structure including a phase-determinative junction and a plurality of arms which meet at said junction, together with two variable-impedance rectifiers within said wave guide structure, each said rectifier being located in a different one of said arms, said rectifiers being differentially connected to a common circuit therefor, and means for applying to said structure and to said rectifiers differentially connected to said common circuit at least one wave phase-modulated in one or the other of two substantially opposite phases.

7. In an information handling system, in combination, a wave supporting structure having a phase-determinative junction and a plurality of wave conducting arms, means for impressing upon one of said arms an input wave A, means for impressing upon another of said arms an input wave B, each of said waves A and B being phase-modulated in one or the other of two substantially opposite phases, whereby each said wave represents, by its phase, an item of information, detector means in at least one of the arms of said structure for sensing the result of combining said input waves and for producing a control signal having one of two conditions, the condition produced depending upon the relative phases of said input waves A and B, a second wave supporting structure having an input arm, an output arm, and phase-controlling means, means supplying waves C of controlled phase to said input arm, and means connecting said detector means of said first wave supporting structure to said phase-controlling means of said second wave supporting structure, to produce in said output arm a wave of one or the other of two substantially opposite phase conditions, as determined by the phases of waves A, B and C.

8. An EXCLUSIVE OR circuit for two alternating current input waves each of which is phase-modulated in one or the other of two substantially opposite phases, which circuit comprises a wave guide junction having a first arm, a second arm and two side arms in each side arm of which is connected a detector diode, said diodes being connected in opposed direct current polarity relationship to an output circuit, means for impressing upon the first arm an input wave A, means for impressing upon the second arm an input wave B of amplitude substantially equal to the amplitude of the said input wave A, whereby input waves of opposite phase to each other produce a response of one direct current polarity in the output circuit and input waves of like phases produce a response of the opposite direct current polarity in the output circuit.

9. An OR circuit for two input waves each of which is phase-modulated in one or the other of two substantially opposite phases, which circuit comprises a wave guide junction having a first arm, a second arm and two side arms together with a diode connected to one of the said side arms, biasing means connected to said diode, said biasing means being poled to bias said diode in the conductive direction, means for impressing upon the first arm an input wave A, means for impressing upon the second arm an input wave B of amplitude substantially equal to the amplitude of the said input wave A, means for impressing upon said diode an input wave of fixed phase and of substantially one-half the amplitude of the said wave A, said wave of fixed phase being of opposite phase to a wave of the phase to which the OR circuit is designed to respond, and an impedance element serially connected between the positive side of the said biasing means and the diode, and an output circuit connected across the terminals of the diode.

10. An AND circuit for two input waves each of which is phase-modulated in one or the other of two substantially opposite phases, which circuit comprises a wave guide junction having a first arm, a second arm and two side arms together with a diode connected to one of the side arms, biasing means connected to said diode, said biasing means being poled to bias said diode in the conductive direction, means for impressing upon the first arm an input wave A, means for impressing upon the second arm an input wave B of amplitude substantially equal to the amplitude of the said input wave A, means for impressing upon said diode an input wave of fixed phase and of substantially one-half the amplitude of the said wave A, said wave of fixed phase being of like phase with respect to a wave of the phase to which the AND circuit is designed to respond, an impedance element serially connected between the negative side of the said biasing means and the diode, and an output circuit connected across the terminals of the diode.

11. An EXCLUSIVE OR circuit for use with waves which are phase-modulated in one or the other of two substantially opposite phases, which circuit comprises a wave guide junction having a first arm, a second arm and two side arms in each side arm of which is connected a diode, an input circuit for said diodes, said diodes being connected in opposed polarity relationship to said diode input circuit, means for impressing upon the first arm a phase-modulated alternating current input wave A of the type hereinabove described, means for impressing upon the said diode input circuit a unidirectional input wave B, and an output circuit connected to the second arm whereby input waves A and B of opposite phase to each other produce a phase-modulated wave of one phase in the output circuit and input waves of like phases produce a phase-modulated wave of the opposite phase in the output circuit, where the phase of input wave B is taken as the polarity of the unidirectional wave.

12. A binary adder for combining an addend, an augend and a carry each represented by a wave which is phase-modulated in one or the other of two substantially opposite phases, said adder comprising two wave guide junctions each having a first arm, a second arm and two side arms, four diodes of which there is one connected in each of the side arms of said wave guide junctions, an output circuit for the diodes associated with a first of said wave guide junctions, the diodes associated with said first junction being connected in opposed polarity relationship to said output circuit, said diode output circuit forming an input circuit for the diodes associated with the second junction, the diodes associated with said second junction being connected in opposed polarity relationship to said diode input circuit, means for impressing upon the first arm of said first junction an input wave A, means for impressing upon the second arm of the said first junction an input wave B of amplitude substantially equal to the amplitude of the said input wave A, means for impressing upon the first arm of the second junction an input wave C of amplitude substantially equal to the amplitude of the said input wave A, whereby an output wave is produced in the second arm of the second junction, said output wave comprising a phase-modulated wave the phase of which represents the required binary sum of the quantities represented by the respective waves A, B and C.

13. A binary adder for combining an addend, an augend and a carry each represented by a wave which is phase-modulated in one or the other of two substantially opposite phases, said adder comprising two wave guide junctions each having a first arm, a second arm and two side arms, four diodes of which there is one connected in each of the side arms of said junctions, the diodes associated with each junction being poled in opposite senses, a first loop circuit connecting a diode in one said junction with a diode in the other said junction, a second loop circuit connecting the remaining two diodes, means for impressing upon the first arm of a first of said junctions an input wave A, means for impressing upon the second arm of the said first junction an input wave B of amplitude substantially equal to the amplitude of the said input wave A, means for impressing upon the first arm of the second junction an input wave C of amplitude substantially equal to the amplitude of the said input wave A, whereby an output wave is produced in the second arm of the second junction, said output wave comprising a phase modulated wave the phase of which represents the required binary sum of the quantities represented by the respective waves A, B and C.

14. A logic circuit for producing an output wave of a specified polarity when only one or two out of three input waves are of a specified polarity, for use with input waves each of which is phase-modulated in one or the other of two substantially opposite phases, which circuit comprises a wave guide junction having a first arm, a second arm and two side arms, a diode in one of said side arms, the other side arm being non-reflectively terminated, means for impressing upon said diode an input wave B, means for impressing upon the first arm of the said junction an input wave A of amplitude equal to substantially twice the amplitude of said input wave B, means for impressing upon the second arm an input wave C of amplitude substantially twice the amplitude of said input wave B, means connected to said diode for biasing said diode in the conductive direction, an impedance element connected serially between the positive side of said biasing means and the diode, and an output circuit connected across the terminals of the diode, whereby a phase-modulated wave representing the desired result is produced in the output circuit.

15. Apparatus according to claim 14, in which said junction is a T junction, said first arm is an E-arm, and said second arm is an H-arm.

16. A two-position switching system operable by means of input waves A, B, C and M, each of which is phase-modulated in one or the other of two substantially opposite phases representable by amplitudes of $+E$ and $-E$ respectively, which system comprises a wave guide junction having a first arm, a second arm, and two side arms, the two side arms each containing a diode, said diodes being connected in opposed polarity relationship to an output circuit, means for impressing upon said first arm the wave M, said wave being of fixed phase, means for impressing the waves B and C upon the respective diodes, said waves B and C being of individually controllable phases to control the polarity of response in the output circuit, and means for impressing the wave A upon said second arm, said wave A being of controllable phase to determine which of the waves B and C shall exert exclusive control over the polarity of response in the output circuit.

References Cited in the file of this patent

UNITED STATES PATENTS

| | | |
|---|---|---|
| 2,652,541 | Cutler | Sept. 15, 1953 |
| 2,704,351 | Dicke | Mar. 15, 1955 |
| 2,801,391 | Whitehead | July 30, 1957 |
| 2,830,288 | Dicke | Apr. 8, 1958 |
| 2,864,953 | DeLange | Dec. 16, 1958 |